Feb. 23, 1954  R. D. NUTTING  2,670,272
METAL OXIDE PRODUCTION
Filed Dec. 15, 1951
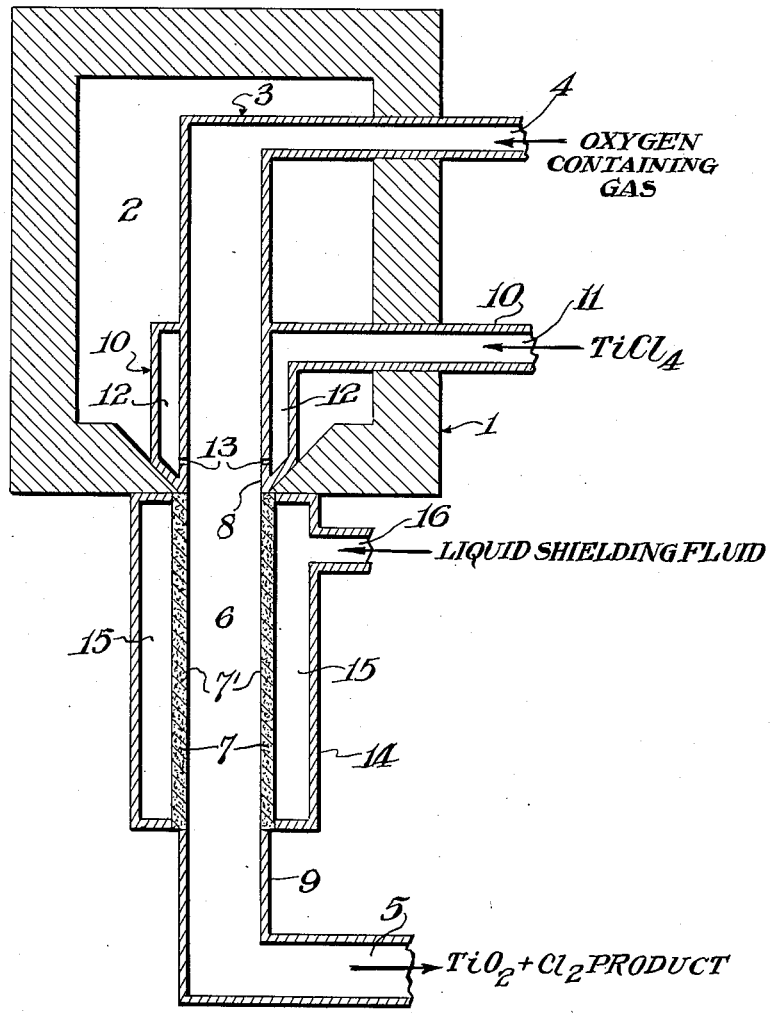
INVENTOR.
Robert D. Nutting
BY
ATTORNEY.

Patented Feb. 23, 1954

2,670,272

UNITED STATES PATENT OFFICE 2,670,272

METAL OXIDE PRODUCTION

Robert D. Nutting, Wilmington, Del., assignor to E. I. du Pont de Nemours and Company, Wilmington, Del., a corporation of Delaware Application December 15, 1951, Serial No. 261,863

8 Claims. (Cl. 23—139)

This invention relates to the production of metal oxides through the vapor phase oxidation or hydrolysis of their halides, and more particularly to the preparation of pigmentary, finely-divided titanium oxide by reacting vaporous titanium tetrachloride with an oxygen-containing gas.

It is known that metal oxides may be produced by oxidizing vaporized metal halides. In these processes a volatilized metal halide, such as a chloride of iron, titanium, silicon, aluminum, etc., is caused to be reacted at elevated temperatures with oxygen, air, or like suitable oxygen-containing gas to yield the respective oxide of the metal and chlorine. In other methods the volatilized metal chloride is reacted with steam to produce the desired metal oxide and hydrogen chloride.

In all of these prior processes, a major difficulty seriously limits their commercial application. This arises from the fact that a portion of the oxide product formed deposits upon and tenaciously adheres to the internal surfaces of the reactor. This deposit is highly objectionable for several reasons. Among other reasons, it represents a loss in a portion of the desired metal oxide because the packing or sintering which occurs renders impossible its recovery in useful form. Again, if formed in a desirable state, the different conditions which prevail at the surface of the reactor over those existing within the reaction space induce undesired particle size growth and to such an extent that its crystallinity renders it unfit for an intended or pigmentary use. Even where loss of material can be tolerated, segments thereof are frequently dislodged from the reactor walls and objectionably contaminate the desirable products recovered from the operation. A further objection resides in the undesired alteration in the configuration of the internal surfaces and dimensions of the reactor which the presence of the deposited mass induces. In processes of the type mentioned, equipment design is frequently a critical factor and even minor dimensional changes cannot be tolerated. Furthermore, if reaction product build-up proceeds for too long a period, the vessel will be completely blocked off or plugged and shut-down for dismantling and clean-out is then necessary. A still further disadvantage is the inhibiting effect and barrier on heat transfer which the presence of the deposited solid exerts. It is often necessary to add to or remove from the reaction mixture substantial quantities of heat, which is conveniently accomplished by means of heat transfer through the reactor walls. Obviously, the presence of a relatively thin layer of solid, non-conductive reaction product upon such walls is often sufficient to retard heat flow to a considerable, undesired extent, especially when such solid is in finely-divided state and interspersed with minute gas pockets.

A number of methods have been proposed for removing these deposits from the oxidation reactor, the majority of which include the equivalent of mechanical scraping means. Since the oxidation reaction takes place at relatively high temperatures and under conditions which are extremely corrosive due to product halogen gas presence, it is usually necessary that the reaction be stopped during the scraping periods. If it is desired to carry out the scraping means during the reaction, expensive, corrosive resistant materials are required and a means must be provided for cooling this equipment and also for obtaining gas-tight stuffing boxes and other mechanical devices. It has also been found that the scraping must be done at quite frequent intervals or the deposit will become so very hard and sintered together that the scraper will fail to dislodge the adherent coating or in doing so will damage the reactor. Fragments of the dislodged scale then represent a harmful portion of the product and means must be then provided for separating this undesirable portion from the main product lot.

It has also been proposed to utilize means to eliminate this wall build-up by sweeping the surfaces of the oxidation reactor with a stream of gas passing along the wall of the reactor and acting as a separation barrier between the wall and the product gas stream which contains the solid metal oxide product. This procedure, disadvantageously, requires a large quantity of shielding gas which interferes greatly with the requirement that the reactants be mixed and reacted rapidly. It has also been found possible to prevent the formation of a solid deposit on the walls of the reactor for relatively short periods by maintaining the reactor walls at a temperature below that at which reaction will take place. However, this method fails in continuous use because it is not absolutely effective. A small amount of solids do form on the surface and these solids decrease the heat transfer to the cooled walls to such an extent that quite soon an effective barrier to the transfer of heat is obtained and the cooling effect is no longer useful.

These difficulties illustrate the real need for an effective, useful, economical and workable method for preventing or minimizing the formation and deposition of a metal oxide deposit upon the interior surfaces of such an oxidation reactor employed in its production.

It is accordingly among the objects of this invention to overcome the disadvantages attending prior methods for oxidizing or hydrolyzing metal halides in the vapor phase, and to provide novel and effective methods and means for attaining such objects. Particular objects of the invention include the production of valuable forms of pigment-useful metal oxides without any accompanying objectionable scale deposition on the internal surfaces of the reactor, and to provide a novel apparatus therefor in which a continuous operation over long periods of time can be effected and which will not limit the choice of favorable conditions required for optimum quality or yield of product. A further object is to provide a novel, effective method for continuously producing pigmentary titanium dioxide by the vapor phase oxidation at elevated temperatures of titanium tetrachloride without encountering objectionable scale formation or deposition on the reactor surfaces and consequent apparatus plugging or inefficient operation. Other objects and advantages will be apparent from the accompanying description and diagrammatic drawing, said drawing being a vertical, sectional view of one useful, illustrative form of apparatus for practically adapting the invention.

These and other objects are attained in this invention which comprises decomposing a vaporized metal halide with an oxidizing gas within a reaction zone provided with a substantially rigid, porous refractory wall, effecting said decomposition while maintaining said wall in relatively cool condition and its surfaces within said zone out of direct contact with the reactants and reaction products by diffusing or flowing a normally gaseous fluid in the liquid state into said wall and sufficient in quantity to prevent any substantial formation or deposition of solids upon the internal surfaces of said zone, and thereafter separating and recovering the products of reaction.

In a more specific embodiment, the invention comprises reacting, preferably at a temperature in excess of 1000° C., titanium tetrachloride with a suitably humidified oxygen-containing gas to continuously produce $TiO_2$, effecting said reaction within a relatively restricted reaction zone comprising a tubular conduit the walls of which are composed of a rigid, porous solid material, throughout the reaction maintaining the surfaces of said conduit in relatively cool condition and a shielding fluid over the internal surfaces thereof by continuously maintaining the exterior surfaces of said conduit in direct contact with a liquid material which is gaseous at normal or room temperature and atmospheric pressure, and continuously and uniformly diffuses through the pores of said porous material into the reaction zone for vaporization therein.

Referring to the drawing, there is shown a conventional type of vertically-arranged furnace 1 adapted to be wholly or partly insulated and heated to any desired temperature and in accordance with any known and desired means (not shown). Suitably disposed within its heating chamber 2 is a tubular conduit 3 composed of corrosion resistant metal or other suitable material capable of withstanding relatively high temperatures and the corrosive action of fluids subjected to reaction and products formed within the apparatus. The conduit 3 is provided with an inlet 4 through which an oxygen-containing gas can be charged as desired to the reactor, and also with an outlet 5 through which products of reaction can be withdrawn for separation and recovery. Substantially intermediate the length of the tubular element 3 there is provided a reaction zone 6 which, as shown, is contained within the dividing side walls 7 of suitable length which form a continuation of walls 8 and 9 of the tubular element 3. The reaction zone or two walls 7 comprise a suitable, rigid, porous refractory material pervious to fluids but not to solid particles and which can consist, for example, of porous (unglazed) porcelain, silica, fire brick, carborundum, nickel, steel, or the like through which a suitable shielding fluid such as liquid chlorine, nitrogen, carbon dioxide, phosgene, etc., can be flowed or diffused and for a purpose which will presently appear. Arranged above the porous tube 7, in concentric, spaced relationship about the tubular element 3, is an associated tubular conduit 10, which, like the tube 3, is also preferably constructed of corrosion-resistant material which will withstand high temperatures and the corrosive action of fluids. The element 10 has an inlet 11 which communicates with a passage 12 and terminates as an annular discharge or slotted jet outlet 13, the latter being formed, as shown, by suitably interpositioning sections of the tubular element 3 in close but spaced proximity to each other. Outlet 13, passage 12 and inlet 11 are maintained in open communication with the interior of conduit 3 and with reaction zone 6. Concentrically disposed in spaced, substantially enveloping and gas-tight relationship about the cylindrical, porous wall member 7 and reaction zone 6, is a cylindrical enclosure element 14, also of corrosion-resistant material, such arrangement forming a passage 15 having an inlet 16 through which the liquid shielding fluid from a source of supply (not shown) can be introduced into the passage 15 to be constantly maintained therein under any desired pressure about the porous walls 7 and reaction zone 6.

In operating an apparatus such as that described, particularly in reference to a preferred adaptation involving the production of pigmentary rutile or anatase titanium dioxide, in accordance with, for example, the methods disclosed in U. S. Patent 2,488,439, by decomposing at temperatures above 800° C., and particularly above 1000° C. and up to about 1350–1450° C., titanium tetrachloride or other suitable titanium halide with an oxidizing gas such as oxygen, air, oxygen-enriched air, or mixtures thereof with various inert gases, and in the presence of regulated, small amounts (about 0.05% to 10% and preferably from 0.1% to 5%, based on the total volume of gases) of water vapor, separately and continuously charged into the reactor through inlet 4 and conduit 3 for passage into the porous walled reaction zone 6. Prior to such introduction, the gas can be suitably preheated to any desired temperature. Immediately prior to passage into the reaction zone 6, it becomes rapidly admixed with vaporized, anhydrous titanium tetrachloride being separately and concurrently fed in a controlled, continuous manner from a source of supply (not shown) into the reactor through the inlet 11 and passage 12 for discharge through the slot jet 13 in the form of a relatively thin sheet or stream into the oxidizing gas being charged to the reactor through conduit 10. Preferably, the $TiCl_4$ reactant is charged into the $O_2$ gas in a direction at right angles to and across the axis of flow of said gas. The quickly mixed reactants pass immediately into the reaction zone where complete reaction, at the temperatures indicated, is effected, the TiCl₄ being oxidized to TiO₂ and chlorine. Simultaneously with and throughout the introduction, passage and reaction of the oxidizing gas and TiCl₄ reactants within the reactor there is constantly maintained within the confining space or passage 15 of the larger-diameter cylindrical jacketing element 14 sealed about an exteriorly enveloping the tubular porous wall 7 a liquid body of a normally gaseous fluid which is inert toward the reactants and reaction products, and which preferably consists of liquid chlorine. This is constantly charged into said passage from a source of supply (not shown) through the inlet 16. This body is preferably maintained within said passage under an elevated pressure, substantially equivalent to the vapor pressure of the fluid at the prevailing temperature, slightly in excess of that prevailing within reaction zone 6 and adequate to force or cause the liquid to slowly, steadily and uniformly flow or diffuse into the porous wall member 7 for evaporation therein and passage in gaseous state into the interior of the reaction zone 6 from the interior surfaces 7' of said porous wall. By thus maintaining a body of readily gasifiable liquid about said wall, advantageously a protective layer of insulating or shielding gas will form over and upon the internal surfaces of the reaction zone to effectively prevent or minimize contact of the reactants or their reaction products with said surfaces and avoid objectionable oxide scale deposition or build-up thereon. In addition, the reaction zone walls are advantageously maintained in relatively cool state due to their direct and constant contact with an associated, cold liquid body and by the cooling effect induced from the heat absorption arising due to latent heat of vaporization when the diffused liquid volatilizes.

The reaction products, containing the TiO₂ in suspension are withdrawn from the reactor via outlet 5, and are quickly cooled or quenched to temperatures below 600° C. to prevent undesired TiO₂ particle growth, as contemplated in said Patent 2,488,439. Thereafter, the pigmentary TiO₂ product is separated and recovered from the quenched products and is then subjected to any desired finishing treatment prior to employment in various pigment uses including paints, enamels, finishes, etc.

To a clearer understanding of the invention, the following specific examples are given. These are merely illustrative and are not to be construed as in limitation of the invention.

*Example I*

Employing a cylindrical reactor vessel of the type shown in the drawing, having an 8.8" inside diameter and 66" long, with the porous reactor wall composed of porous nickel, ½" thick and having a porosity of 50%, there was introduced and mixed therein for reaction: 23,700 lbs./hr. of TiCl₄ preheated to 1000° C. and 4,400 lbs./hr. of O₂ preheated to 1000° C. containing 118 lbs. of added water vapor. The reactants formed TiO₂, Cl₂ and a small amount of HCl with the liberation of a large amount of heat from the reaction. The reactor stream approximated 1300° C. and the porous reactor wall was protected from the intense heat (both radiation and conduction) by forcing through it 5,600 lbs./hr. of liquid chlorine from a body of that liquid constantly maintained about said wall throughout the oxidation reaction. This amount of chlorine effectively cooled the reactor wall, by heat of vaporization and by specific heat, to maintain the temperature of said wall at no higher than 300° C. In consequence deposition of any scale on the surface of the wall was effectively prevented. The chlorine added in this manner did not interfere with the progress of the reaction, since the gaseous product in the reactor changes in composition only from 89.3% Cl₂, 5.9% O₂, 4.8% HCl to 91.7% Cl₂, 4.6% O₂, 3.7% HCl by volume. The pigmentary properties of the TiO₂ formed and recovered from the operation were determined to be excellent, and the product gas recovered therefrom was re-used to chlorinate a titaniferous ore to form TiCl₄.

*Example II*

Employing the same apparatus as that used in Example I and the same quantities of reactants, 23,700 lbs./hr. TiCl₄, 4,400 lbs./hr. of O₂ containing 118 lbs. of water vapor, all preheated to 1000° C. prior to mixing, the procedures of that example were duplicated, except that instead of Cl₂ employment as the shielding fluid, 4,225 lbs./hr. of liquid nitrogen are forced into the porous reactor wall from a surrounding body of that reagent. As in the foregoing example heating of said wall to above 300° C. was effectively prevented and a high quality TiO₂ pigment was recovered. The composition of the product was approximately: 57.3% Cl₂, 35.6% N₂, 4% O₂, 3.1% HCl.

*Example III*

The reaction between TiCl₄ and O₂ is essentially complete within a space 3 reactor diameters distant from their point of mixing within a "slotted jet" reactor device arrangement of the type shown in the drawing. Essentially all wall scale forms within this top zone of 3 reactor diameters. In a modified form of apparatus in which only this portion of the reactor was shielded and cooled by the use of the shielding fluid in accordance with this invention with the remaining reactor length being protected from overheating by a conventional cooling jacket surrounding the reactor wall there was introduced and mixed: 1,190 lbs./hr. of TiCl₄ preheated to 1000° C. and 220 lbs./hr. of oxygen, containing 6 lbs. of water vapor preheated to 1000° C. before mixing with the TiCl₄.

The cylindrical reactor used had a 3.25" inside diameter and was 24" long. The first 10" of its reaction zone wall, measured from the point of mixing (i. e. the slotted jet), was composed of porous nickel, ½" thick with a porosity of 50%. The remaining 14" of said wall was made of ½" thick solid nickel surrounded by a cooling jacket through which a cooling oil was circulated to effect cooling of the wall.

The 10" porous portion of the reactor wall was protected from overheating and maintained at a temperature below 300° C. to prevent scale deposition thereon by continuously forcing through it 279 lbs. of Cl₂ per hour from a body of liquid chlorine maintained for that purpose about said portion.

From this operation an excellent TiO₂ pigment product was recovered together with a product gas the composition of which was approximately 91.7% Cl₂, 4.5% O₂, and 3.8% HCl.

Upon termination of the run the apparatus was dismantled and inspected. It was found that scale deposition was non-existent upon the internal surfaces of the 10 inch porous portion of the reaction tube while the surfaces of the 14 inch portion were coated with a fine TiO$_2$ dust not exceeding $\frac{1}{32}''$ in thickness. This pigment dust layer adhered poorly to the cooled reactor wall enabling it to be constantly swept off by the high velocity of the gases passing through the reactor, approximately 90 feet per second.

*Example IV*

Example III was duplicated, except that instead of utilizing Cl$_2$ as the shielding fluid, 257 lbs. of liquid N$_2$ per hour were forced into the porous reactor wall which resulted in preventing it from becoming heated to above 300° C. during the oxidation. An excellent quality TiO$_2$ pigment was recovered and the composition of product gas obtained was approximately: 53.2% Cl$_2$, 3.7% O$_2$, 2.8% HCl, 40.3% N$_2$. As in Example III no scale deposition occurred upon the internal surfaces of the porous wall. The high gas velocity of approximately 130 ft./sec. swept the cooled, lower, non-porous 14'' section of the reactor and prevented the formation of a layer of pigment dust in excess of $\frac{1}{32}''$ thick on the reactor wall.

Although described as applying to certain specific embodiments the invention is not limited thereto. The particular reactants, temperatures, retention times, ratios, velocities and apparatus mentioned are not limiting and suitable variance therefrom is contemplated. Thus, although outstandingly useful in converting titanium tetrachloride by oxidation to a titanium dioxide pigment, the invention is also useful for oxidizing other metal halides or mixtures of halides (chlorides, iodides or bromides), including those of such metals as titanium, zirconium, aluminum, silicon, antimony, tin, zinc, etc. adapted to react in the vapor phase with an oxygen containing gas to produce a solid metal oxide. Similarly, while pure oxygen comprises a preferred oxidizing medium, air or other mixtures of oxygen with various inert gases also can be utilized. Likewise, while oxygen suitably humidified with water is preferred for use, this or other oxidizing gases, in either dry or humidified state can be employed if desired.

The pressure within the oxidation reaction is not considered as limiting since the oxidation reaction can be effected if desired at super, sub, or atmospheric pressures, provided the pressure of the shielding fluid on the exterior of the porous wall reactor is varied accordingly to maintain the necessary differential pressure required for transporting such fluid through the pores of said wall. Similarly, any type or size of reactor conforming to the intended scale of operation can be used, and while resort to a continuous type of operation is preferred, a batch or semi-continuous type of procedure can be adapted. In the preferred embodiment, the time of retention of the reactants and products within the reaction zone will be found important relative to the properties of the TiO$_2$ pigment recovered. In such instances, retention times ranging from .01 to 5 seconds are generally employed with a preferred period ranging from one-tenth to one second. Recourse to these retention times will be found to prevent undesirable particle size growth, which, if allowed to take place, would impart poor properties to the pigment.

In the drawing, the reaction vessel comprises a cylindrical porous tube sealed into a gas-tight cylindrical jacket of slightly larger diameter having an inlet for the introduction of the liquid shielding fluid into the space surrounding the porous walled reactor. As noted, the pressure of the shielding fluid within this space is maintained above that within the reaction zone so that the desired amount of shielding fluid will flow steadily from the outside of the wall, through the wall, and into the reaction zone to provide a protective film of gaseous shielding fluid on the porous wall surface of the reaction zone which is exposed to the reaction mixture and products. In the particular instances given in the examples, the oxidation reaction produces a large quantity of heat. This heat is transferred to the porous walls of the oxidation reactor by radiation and convection. To insure that said walls will not be destroyed by corrosion or melting it is necessary that suitable cooling means therefore be provided. Conventional means of cooling the reactor wall have proved incapable of providing sufficient protection from thermal and corrosive action. These include wrapping the exterior of the wall with metal coils through which a cooling fluid is circulated; the attachment of metal fins which increase the area of metal in contact with the cooling gas; and the use of a gas cooled to a very low temperature. Those which require the adfixing of metal parts to the exterior of the wall tend to render the distribution of the shielding fluid non-uniform, while methods which depend upon a transfer of heat to a gas are relatively inefficient. In this invention the heat transfer from a metal to a boiling liquid is utilized, which transfer is in the range of from 100 to 200 times as effective as the heat transfer to a gas. Also, in the transfer of heat to a liquid it is possible to utilize the latent heat of vaporization of the liquid as a heat sink and obtain additionally the amount of heat absorbed by the sensible heat pickup in the gas. To illustrate this fact with gaseous chlorine at —3° C. on the exterior of the porous wall and the interior portion of the wall at 300° C., it is possible to absorb 2,400 calories per gram mole of chlorine passing into the reaction zone. If liquid chlorine also at —3° C. is utilized as the shielding fluid on the exterior of the porous wall, passing through the wall into the reaction zone with the inner wall at 300° C., 6,500 calories per gram mole of chlorine will be absorbed. This shows that the use of such a liquid shielding fluid gives a decided advantage in the amount of heat that may be absorbed, i. e. 2.7 times. This means that, advantageously, a much smaller quantity of shielding fluid can be utilized to prevent the reactor walls from being attacked either thermally or chemically.

The effectiveness of the shielding film herein contemplated will depend upon its continuity over the entire inner porous wall of the reactor. If desired, resort can be had to sectional manifolds to proportion the fluid to different zones of the reactor. In addition, the invention can be applied to the protection of the reactor inlet jets, or to other reactor surfaces upon which objectionable oxide deposits might occur.

Many different types of porous refractory materials can be utilized in the invention. The choice of a particular material for an application will depend upon many conditions, among which are the chemical and thermal conditions, and required material strength. The particular porosity utilized in the porous wall and the size of the pores and partitions between pores are items which must also be considered because they affect the amount of shielding fluid which will be required for preventing solids deposition.

A suitable porous material can be obtained by conventionally sintering a suitably shaped material from the molding of granular materials having the desired resistance to the thermal and chemical conditions encountered in the reaction. Also, the porous wall material must be inert and resistant to the shielding fluid utilized and within the temperature range encountered during the oxidation reaction. Suitable materials for preferred adaptations of the invention include aluminum oxide, zirconium dioxide, porous carbon or graphite, nickel, silica, platinum, tantalum, etc. For other applications these and other materials, such as porous aluminum, magnesium, steel, porcelain, etc. can be utilized. In general, a porous wall material having an average pore diameter of less than 250 microns is suitable, a preferred pore diameter range therefore being from 1–100 microns.

Shielding fluids particularly adaptable for use herein comprise those which at room (20° C.) or normal temperatures and atmospheric pressure exist in the gaseous state and have a boiling point below the temperature at which deleterious reaction occurs between the material of the porous wall and the reactants or products or shielding fluid used, do not adversely effect the apparatus or the products of the reaction. In other words, since in the preferred example the chlorine gas product advantageously recycled to produce more metal halide reactant, it is not desirable to utilize a shielding fluid which will combine with the chlorine to prevent such use in the subsequent chlorination step. In the preferred example, shielding fluids such as those containing hydrogen which would combine with the chlorine to form hydrochloric acid are not suitable. This same consideration of retaining the products in the desired state is applicable to other possible applications of the invention. As already indicated, preferred shielding fluids include liquid chlorine, nitrogen, carbon dioxide, carbonyl chloride, etc.

The volume of the shielding fluid to be used must be determined separately for each particular application since it will depend upon the shape and size of the reaction vessel; the velocity, temperatures and composition of the reacting gases; the nature of the shielding fluid; the uniformity and degree of porosity of the porous wall, the degree of protection desired; and other factors. By the invention a protecting film of shielding gas is provided on the inner surfaces of the reaction zone whereby penetration of solid scale product to the wall and its adherence thereto is inhibited. Obviously, factors such as modifications in reactor design which tend to increase the velocity of impingement of the particles towards this protective film and changes in throughput velocity which tend to create a more turbulent interfacial layer resulting in the surface protecting layer of shielding gas to become thinner are additional items which must be taken into consideration.

It is apparent that the invention is readily adapted to fit the needs of various types of oxidation or hydrolysis processes wherein a solid metal oxide is produced and that by its practice, an economical continuous type of process is afforded over prior, difficult batch-type of operation wherein metal oxide scale formation results in apparatus plugging and frequent shut downs. Advantageously, these beneficial effects are realized herein without adversely affecting the course of the reaction, the type of products to be obtained or critically limiting the variations in factors which are desirably controlled.

I claim as my invention:

1. A method for decomposing a vaporized metal halide with an oxidizing gas which comprises effecting said decomposition within a reaction zone provided with a substantially rigid, porous refractory wall, maintaining said wall in relatively cool condition, below about 300° C., and the surfaces thereof within said zone out of direct contact with the reactants and reaction products by forcing an inert, normally gaseous fluid in the liquid state into said wall during the decomposition for vaporization on said surfaces, and recovering the metal oxide product from the resulting reaction products.

2. A method for inhibiting oxide scale deposition and buildup upon the internal surfaces of a reactor during employment of the latter in the vapor phase oxidation of a metal halide which comprises forming a wall of the oxidation zone of said reactor with a substantially rigid, porous refractory material, and maintaining said wall in relatively cool state, below about 300° C., and a layer of shielding gas over its reaction zone surfaces by forcing for vaporization on said surfaces a normally gaseous inert fluid into its pores from a body of said fluid maintained under pressure and in liquid state about an opposite wall surface.

3. A method for inhibiting oxide scale deposition and buildup upon the internal surfaces of a reactor employed in the vapor phase oxidation of a metal chloride which comprises forming a wall of the oxidation zone of said reactor with a substantially rigid, porous refractory material, and during the oxidation reaction maintaining said wall in relatively cool state, below 300° C., and a layer of shielding gas over the surfaces thereof within said zone by charging an inert, normally gaseous fluid through its pores for emergence in vaporized state into said zone from a body of said fluid which is maintained in liquid state against an opposite surface of said wall and under a pressure in excess of that which prevails within said reaction zone.

4. A method for inhibiting oxide scale deposition and buildup upon the internal surfaces of a reactor during employment of the latter in the vapor phase oxidation of a metal chloride which comprises forming a wall of the oxidation zone of said reactor with a substantially rigid, porous refractory material, maintaining said wall in cool, below 300° C., condition and a layer of shielding gas over the surfaces thereof within said zone by continuously forcing an inert, normally gaseous fluid into the pores of said wall from a body of said fluid constantly maintained in liquid state and under pressure about the exterior surfaces of said wall.

5. A method for inhibiting oxide scale deposition and buildup upon the internal surfaces of a reaction zone employed in the vapor phase oxidation of a metal chloride which comprises providing a substantially rigid, porous refractory wall in said zone and mainatining said wall in cool, below 300° C., state and a layer of shielding gas over its surfaces within said reaction zone by continuously charging liquid chlorine into the pores of said wall and from a body of liquid chlorine maintained under pressure about a surface thereof opposite to that within said reaction zone.

6. A method for inhibiting oxide scale deposition and buildup upon the internal surfaces of a reaction zone employed in the vapor phase oxidation of a metal chloride which comprises providing a substantially rigid, porous refractory wall in said zone and maintaining said wall in cool, below 300° C., state and a layer of shielding gas over its surfaces within said reaction zone by continuously charging liquid nitrogen into the pores of said wall and from a body of liquid nitrogen maintained under pressure about a surface thereof opposite to that within said reaction zone.

7. A method for inhibiting $TiO_2$ scale deposition and buildup upon the internal surfaces of a reactor employed in the vapor phase oxidation of titanium tetrachloride which comprises forming the defining wall of the oxidation zone of said reactor of a substantially rigid, porous refractory material, and throughout the oxidation reaction maintaining said wall in relatively cool, below 300° C., state and a layer of shielding gas over the surfaces thereof within said reaction zone by continuously charging into the pores of said wall an inert, normally gaseous fluid from a body of said fluid maintained in the liquid state about a surface of said wall opposite to that within said reaction zone, said body being under a pressure in excess of that prevailing within said reaction zone.

8. A method for decomposing titanium tetrachloride while inhibiting $TiO_2$ reaction product deposition and build-up on the internal surfaces of a reactor employed in the vapor phase oxidation, at temperatures above 800° C. and to about 1350° C., of said tetrachloride with an oxygen-containing gas, comprising effecting said oxidation in a reaction zone the defining walls of which comprise rigid, porous graphite, and throughout the oxidation reaction cooling said walls to below 300° C. and maintaining a protective layer of a shielding gas over the surfaces thereof disposed within said reaction zone by slowly diffusing in liquid state through the porous graphite an inert, normally gaseous fluid maintained as a liquid body over the surface of said walls opposite to those disposed within said reaction zone, and recovering the $TiO_2$ product from the products of reaction.

ROBERT D. NUTTING.

References Cited in the file of this patent

UNITED STATES PATENTS

| Number | Name | Date |
|---|---|---|
| 1,685,759 | Walter | Sept. 25, 1928 |
| 1,881,041 | Benjamin | Oct. 4, 1932 |
| 1,967,235 | Ferkel | July 24, 1934 |
| 2,062,358 | Frolich | Dec. 1, 1936 |